US00RE41048E

(19) United States
(12) Reissued Patent
Davis et al.

(10) Patent Number: US RE41,048 E
(45) Date of Reissued Patent: Dec. 22, 2009

(54) COMBINED LITHOGRAPHIC/ FLEXOGRAPHIC PRINTING APPARATUS AND PROCESS

(75) Inventors: Bill L. Davis, Irving, TX (US); Jesse S. Williamson, Dallas, TX (US)

(73) Assignee: Williamson Printing Corporation, Dallas, TX (US)

(21) Appl. No.: 09/315,796

(22) Filed: May 20, 1999

Related U.S. Patent Documents

Reissue of:
(64) Patent No.: 5,630,363
Issued: May 20, 1997
Appl. No.: 08/515,097
Filed: Aug. 14, 1995

(51) Int. Cl.
*B41M 1/18* (2006.01)
*B41M 1/04* (2006.01)
*B41M 7/00* (2006.01)
*B41F 23/00* (2006.01)

(52) U.S. Cl. ..... 101/141; 101/135; 101/136; 101/137; 101/138; 101/142; 101/143; 101/450.1; 101/491; 101/DIG. 29; 101/DIG. 49; 101/181; 101/183; 101/424.1; 101/424.2; 101/479; 101/483; 101/174; 101/416.1; 101/141

(58) Field of Classification Search ..... 101/135–138, 101/141–143, 174, 180, 181, 183, 416.1, 101/424.1, 424.2, 450.1, 479, 480, 483, 491, 101/DIG. 29, DIG. 49; 118/46
See application file for complete search history.

(56) References Cited

U.S. PATENT DOCUMENTS

| | | | | |
|---|---|---|---|---|
| 2,279,204 | A | 4/1942 | Neilson | 101/415.1 |
| 2,320,523 | A | 6/1943 | Jirousek | 101/147 |
| 2,333,962 | A | 11/1943 | Terry | 101/351 |
| 2,499,870 | A | 3/1950 | Luehrs | 101/138 |
| 2,531,036 | A | 11/1950 | Goettsch | 118/212 |

(Continued)

FOREIGN PATENT DOCUMENTS

| | | | |
|---|---|---|---|
| CH | 319962 | | 3/1957 |
| DE | 21 51 185 | B2 | 7/1979 |
| DE | 0 293 586 | A2 | 5/1987 |
| DE | A4122 990 | | 1/1993 |
| DE | 93 05 552.8 | | 7/1993 |
| DE | 42 13 024 | A1 | 10/1993 |
| DE | 4311834 | A1 | 10/1994 |
| EP | 0 270 054 | A2 | 12/1986 |
| EP | 499 382 | | 7/1993 |
| EP | 620115 | | 10/1994 |
| EP | 0647524 | A1 | 4/1995 |
| EP | 741025 | * | 11/1996 |
| GB | 924.401 | | 4/1963 |
| GB | 2263438 | A | 7/1993 |

OTHER PUBLICATIONS

Brochure, "Oxy–Dry Blanket Coater" (1987), Oxy–Dry Corporation, Elk Grove Village, Illinois.
Brochure, Product Data Dahlgren Blanket Coater (Approx. 1988+), Dahlgren Mfg. Co., Dallas, Tx.
Pictures of Rapidac Blanket Coater (early 1990's or late 1980's) Rapidac Mfg. Co.

(Continued)

*Primary Examiner*—Judy Nguyen
*Assistant Examiner*—Joshua D. Zimmerman
(74) *Attorney, Agent, or Firm*—Kenneth R. Glaser; Gardere Wynne Sewell LLP

(57) ABSTRACT

A combined lithographic/flexographic printing process having a plurality of successive printing stations for printing color images on a substrate in a continuous in-line process. One of the stations prints a first color image using the flexographic process and at least one of the successive printing stations prints a second color image over the first color image using an offset lithographic process in the continuous in-line process.

54 Claims, 1 Drawing Sheet

U.S. PATENT DOCUMENTS

| | | | | | |
|---|---|---|---|---|---|
| 2,988,989 | A | | 6/1961 | Crawford | 101/152 |
| 3,072,050 | A | | 1/1963 | Wolff | 101/177 |
| 3,360,393 | A | | 12/1967 | Rhorer | 117/38 |
| 3,397,675 | A | | 8/1968 | Deligt | 118/258 |
| 3,433,155 | A | | 3/1969 | Norton | 101/148 |
| 3,536,006 | A | | 10/1970 | Roozee | 101/137 |
| 3,604,350 | A | | 9/1971 | Rosenstadt | 101/181 |
| 3,749,011 | A | | 7/1973 | Abendroth et al. | 101/148 |
| 3,768,438 | A | | 10/1973 | Kumpf | 118/262 |
| 3,800,743 | A | | 4/1974 | Egnaczak | 118/259 |
| 3,916,824 | A | | 11/1975 | Knodel et al. | 118/224 |
| 3,931,791 | A | | 1/1976 | Preuss et al. | 118/236 |
| 3,986,452 | A | | 10/1976 | Dahlgren | 101/148 |
| 4,011,812 | A | | 3/1977 | Lecha | 101/176 |
| 4,056,056 | A | | 11/1977 | Giori | 101/152 |
| 4,109,572 | A | * | 8/1978 | Roulleau | 101/37 |
| 4,165,688 | A | | 8/1979 | Leanna et al. | 101/207 |
| 4,180,407 | A | | 12/1979 | Gibson et al. | 106/26 |
| 4,186,661 | A | | 2/1980 | Vieau | 101/178 |
| 4,188,883 | A | * | 2/1980 | Schone et al. | 101/183 |
| 4,222,325 | A | | 9/1980 | Edwards | 101/137 |
| 4,270,483 | A | | 6/1981 | Butler et al. | 118/46 |
| 4,308,796 | A | | 1/1982 | Satterwhite | 101/143 |
| 4,372,244 | A | | 2/1983 | Rebel | 118/46 |
| 4,373,442 | A | | 2/1983 | Dahlgren et al. | 101/207 |
| 4,373,443 | A | | 2/1983 | Matalia et al. | 101/221 |
| 4,379,039 | A | | 4/1983 | Fujimoto et al. | 204/159.15 |
| 4,396,650 | A | | 8/1983 | Lange et al. | 427/409 |
| 4,397,237 | A | | 8/1983 | Makosch | 101/352 |
| 4,399,767 | A | | 8/1983 | Simeth | 118/46 |
| 4,402,267 | A | | 9/1983 | DeMoore | 101/419 |
| 4,403,550 | A | * | 9/1983 | Sharp | 101/452 |
| 4,417,516 | A | * | 11/1983 | Fischer | 101/181 |
| 4,421,027 | A | | 12/1983 | Fischer | 101/142 |
| 4,423,677 | A | | 1/1984 | Fischer | 101/232 |
| 4,437,402 | A | | 3/1984 | Fischer | 101/181 |
| 4,446,814 | A | | 5/1984 | Abendroth et al. | 118/694 |
| 4,451,509 | A | | 5/1984 | Frank et al. | 427/54.1 |
| 4,501,223 | A | | 2/1985 | Matsuno et al. | 118/668 |
| 4,524,712 | A | | 6/1985 | Ito | 118/46 |
| 4,536,218 | A | | 8/1985 | Ganho | 106/290 |
| 4,569,306 | A | | 2/1986 | Ito et al. | 118/249 |
| 4,574,732 | A | | 3/1986 | Verwey et al. | 118/642 |
| 4,586,434 | A | | 5/1986 | Tokuno et al. | 101/178 |
| 4,610,201 | A | * | 9/1986 | Jeschke | 101/DIG. 49 |
| 4,615,293 | A | | 10/1986 | Jahn | 118/46 |
| 4,617,865 | A | | 10/1986 | Switall | 101/350 |
| 4,685,414 | A | | 8/1987 | DiRico | 118/46 |
| 4,704,296 | A | | 11/1987 | Leanna et al. | 427/9 |
| 4,706,601 | A | | 11/1987 | Jahn | 118/46 |
| 4,729,909 | A | | 3/1988 | Noack | 427/288 |
| 4,753,166 | A | | 6/1988 | Fischer | 101/349 |
| 4,758,886 | A | | 7/1988 | Rylander | 358/80 |
| 4,779,557 | A | | 10/1988 | Frazzita | 118/46 |
| 4,796,528 | A | | 1/1989 | Sarazen | 101/208 |
| 4,796,556 | A | | 1/1989 | Bird | 118/46 |
| 4,808,443 | A | * | 2/1989 | Minamoto et al. | 101/463.1 |
| 4,815,413 | A | | 3/1989 | Kota | 118/46 |
| 4,821,672 | A | | 4/1989 | Bruno | 118/261 |
| 4,825,804 | A | | 5/1989 | Dirico et al. | 118/46 |
| 4,841,903 | A | * | 6/1989 | Bird | 118/46 |
| 4,848,265 | A | | 7/1989 | Komori | 118/46 |
| 4,852,515 | A | | 8/1989 | Terasaka et al. | 118/663 |
| 4,882,991 | A | | 11/1989 | Simeth | 101/350 |
| 4,889,051 | A | | 12/1989 | Sarda | 101/77 |
| 4,895,070 | A | | 1/1990 | Bird | 101/148 |
| 4,919,048 | A | | 4/1990 | Tyler | 101/217 |
| 4,936,211 | A | | 6/1990 | Pensavecchia et al. | 101/136 |
| 4,934,305 | A | | 7/1990 | Koehler et al. | 118/46 |
| 4,939,992 | A | | 7/1990 | Bird | 101/183 |
| 4,977,828 | A | | 12/1990 | Douglas | 101/142 |
| 4,989,079 | A | | 1/1991 | Ito | 358/80 |
| 4,989,080 | A | | 1/1991 | Ito | 358/80 |
| 5,079,044 | A | * | 1/1992 | Schumacher et al. | 427/428 |
| 5,088,404 | A | | 2/1992 | MacConnell et al. | 101/232 |
| 5,107,790 | A | | 4/1992 | Sliker et al. | 118/674 |
| 5,115,741 | A | * | 5/1992 | Rodi | 101/424.1 |
| 5,127,329 | A | | 7/1992 | DeMoore et al. | 101/420 |
| 5,144,419 | A | | 9/1992 | Nakatsuka et al. | 358/75 |
| 5,176,077 | A | | 1/1993 | DeMoore et al. | 101/142 |
| 5,178,678 | A | | 1/1993 | Koehler et al. | 118/46 |
| 5,184,556 | A | | 2/1993 | Schaeuble | 101/483 |
| 5,189,960 | A | | 3/1993 | Valentini et al. | 101/487 |
| 5,207,159 | A | | 5/1993 | DeMoore et al. | 101/350 |
| 5,209,179 | A | | 5/1993 | Herbert et al. | 118/46 |
| 5,243,907 | A | | 9/1993 | Welshew | 101/208 |
| 5,280,750 | A | | 1/1994 | Yoshida et al. | 101/363 |
| 5,317,971 | A | | 6/1994 | Deye et al. | 101/486 |
| 5,335,596 | A | | 8/1994 | DeMoore et al. | 101/350 |
| 5,370,976 | A | | 12/1994 | Williamson et al. | 430/358 |
| 5,476,041 | A | | 12/1995 | Czotscher | 101/232 |
| 5,476,042 | A | | 12/1995 | Ehrhard et al. | 101/325 |
| 5,598,777 | A | | 2/1997 | De Moore et al. | 101/177 |
| 5,638,752 | A | | 6/1997 | Hartung et al. | 101/177 |
| 5,651,316 | A | | 7/1997 | De Moore et al. | 101/450.1 |
| 5,960,713 | A | * | 10/1999 | DeMoore et al. | 101/137 |

OTHER PUBLICATIONS

"The Versatile Two in One—Dahlgren Coater Dampener", printed by Intenso Offset bv, Amsterdam, with Dahlgren Dampening system, 1978.

"Liquid Application System (LAS®)" Dalgren® Dampener Division, ©Dahlgren® Mfg. Co. 1981.

Dahlgren LithoPlus Coater, Sep./Oct. 1995.

Retraction System Designs by James E. Taylor and D.R. Selby, 1984–1985.

"Busch Zeigt Innovation für den Offset in Dörtmund", Offsetpraxis, Mar. 1993, pp. 12–15 (translated).

Erwin Schulz "Flexodruck von A bisz", at p. 160, Reference Book and Practical Guide, Polygraph Publishers (Frankfurt) (translated).

Druckindustrie (Magazine for the Graphic Industry of Switzerland, Zürich), 9001 St. Gallen, No. 5, Mar. 11, 1993, "Nach Golde drängt am Golde hängt doch alles", Title page, Masthead, pp. 22–23 (translated).

Magazine, "Flexodruck", Feb. 1993, pp. 42–43, "Goldlackdruck löst Metalilronzierung ab" (translated).

Brochure, "Dahlgren, the Greatest Performance In Printing" (early 1990's), Dahlgren Mfg. Co., Dallas, Tx.

Brochure, "HVP Show Informer" (Oct. 1995), Dahlgren Mfg. Co., Dallas, Tx.

"Lackier—Aggregat für Speedmaster–Maschinen", 4560 Papier & Kunstoff Vernbei 26 (1991), Jne, No. 6.

Brochure, "Dahlgren Coater Dampener" (1978), Dahlgren Mfg. Co., Dallas, Tx.

Brochure, "Dahlgren Liquid Application System (LAS*)" (1981) Dahlgren Mfg. Co., Dallas, Tx.

Brochure, "Super Blue PBC Plate/Blanketed PC Plate Coater" (c. 1994), Printing Research, Inc., Dallas, Tx.

Brochure, Dahlgren Single Roll Coater (1992), Dahlgren Mfg. Co., Dallas, Tx.

Brochure "IVT Colordry Blanket Coater" (early 1990's), IVT Colordry, Inc., Fairfield, Connecticut.

Brochure "IBC Blanket Coating System" (1984), International Blending Corporation, Minneapolis, MN.

Brochure, "Dahlgren Coater Printer" (1986), Dahlgren Mfg. Co., Dallas, Tx.

Brochure, "Dahlgren Groupe De Vernissage Blanchet" (1987), Dahlgren Mfg. Co., Dallas, Tx.
Brochure, "Oxy–Dry Blanket Coater" (1987), Oxy–Dry Corporation, Elk Grove Village, Illinois.
Brochure, Product Data Dahlgren Blanket Coater (Approx. 1988+), Dahlgren Mfg. Co., Dallas, Tx.
Brochure, "Dahlgren Blanket Coater", Product Data Bulletin (Approx. 1990), Dahlgren Mfg. Co., Dallas, Tx.
Brochure, Dahlgren's new Lithoplus Coating System, (1990), Dahlgren Mfg. Co., Dallas, Tx.
Brochure, Epic 3 Roll Coaters, Epic Products Int'l. Corp. (1991), Arlington, Tx.

Brochure, LF 200 Flexo Press, RDP Marathan, Inc., Quebeck Canada, (English) Printed Aug. 19, 1994.

"Pantone® Metallic Integrated Process Color Selector, Pantone Metallic–Buntdruck–Farbskala", The PANTONE Library of Color, ©Pantone, Inc. 1990, pp. MIPP VI–VIII.

* cited by examiner

COMBINED LITHOGRAPHIC/ FLEXOGRAPHIC PRINTING APPARATUS AND PROCESS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates in general to printing machines and processes and in particular to a combined lithographic/flexographic in-line printing apparatus and process.

2. Description of Related Art

As used herein, the following terms have the meanings indicated:

ANILOX ROLLER

A steel or ceramic ink metering roller. Its surface is engraved with tiny, uniform cells that carry and deposit a thin, controlled layer of ink film or coating material onto the plate. In [flexo] *flexograhic* presswork, anilox rollers transfer a controlled ink film from the rubber plate (or rubber-covered roller) to the web to print the image. Anilox rollers are also used in remoistenable glue units and to create "scratch-and-sniff" perfume ads.

ANILOX SYSTEM

The inking method commonly employed on flexographic presses. An elastomer-covered fountain roller supplies a controlled ink film from the ink pan to the engraved metering roller. After ink floods the metering roller, the fountain roller is squeezed or wiped usually with a doctor blade to remove the excess ink. The ink that remains on the metering roller is then transferred to the rubber printing plate.

COATER

A device with a pan to contain the coating material, a pan roller partially immersed in the coating material contained in the pan, and a coater roller to meter off a uniform film of the coating material and apply it to the printing plate.

COATING

An unbroken, clear film applied to a substrate in layers to protect and seal it, or to make it glossy.

FLEXOGRAPHIC INK

A quick-drying, fluid ink that is highly volatile or an ink that can be water based and nonvolatile.

FLEXOGRAPHY

A method of rotary letterpress printing characterized by the use of flexible, rubber, or plastic plates with raised image areas and fluid, rapid-drying inks.

HALFTONES

Dot-pattern images that have the appearance of continuous-tone images because of the limited resolving power of the human eye. This limitation accounts for an optical illusion; small halftone dots, when viewed at the normal reading distance, cannot be resolved as individual dots but blend into a continuous tone.

LITHOGRAPHIC PLATES

A lithographic plate is precoated with a light-sensitive or otherwise imageable coating, and the separation between the image and nonimage areas is maintained chemically. The image areas must be ink receptive and refuse water and the nonimage areas must be water receptive and refuse ink. The wider the difference maintained between the ink receptivity of the image areas and the water receptivity of the nonimage areas, the better the plate will be, the easier it will run on the press, and, consequently, the better the printing. There are several types of lithographic plates. The plate is an image carrier that is said to be planographic, or flat and smooth.

LITHOGRAPHY

A printing process in which the image carrier or plate is chemically treated so that the image areas are receptive to ink.

OFFSET PRINTING

An indirect printing method in which the inked image on a press plate is first transferred to a rubber blanket, that in turn "offsets" the inked impression to a press sheet. In offset lithography, the printing plate has been photochemically treated to produce image areas receptive to ink.

SLURRY

A water suspension of fibers or the suspension of pigment and adhesive used to coat papers. It may also include a suspended metallic material such as uniform-sized metal particles or nonuniform-sized metal particles.

ULTRAVIOLET INKS

Printing inks containing an activator that causes the polymerization of binders and solvents after exposure to a source of ultraviolet radiation.

Offset lithography is a process that is well known in the art and utilizes the planographic method. This means that the image and nonprinting areas are essentially on the same plane of a thin metal plate and the distinction between them is maintained chemically. There are two basic differences between offset lithography and other processes. First, it is based on the principle that grease and water do not mix. Second, the ink is offset from the first plate to a rubber blanket and then from the blanket to a substrate on which printing is to occur such as paper.

When the printing plate is made, the printing image is made grease receptive and water repellent and the nonprinting areas are made water receptive and ink repellent. The plate is mounted on the plate cylinder of the press which, as it rotates, comes in contact successively with rollers wet by a water or dampening solution and rollers wet by ink. The dampening solution wets the nonprinting areas of the plate and prevents the ink from wetting these areas. The ink wets the image areas which are transferred to the intermediate blanket cylinder. The inked image is transferred to the substrate as it passes between the blanket cylinder and the impression cylinder. Transferring the image from the plate to a rubber blanket before transfer to the substrate is called the offset principle.

One major advantage of the offset principle is that the soft rubber surface of the blanket creates a clear impression on a wide variety of paper surfaces and other substrate materials with both rough and smooth textures with a minimum of press preparation.

Offset lithography has equipment for short, medium and long runs. Both sheetfed and web presses are used. Sheetfed lithography is used for printing advertising, books, catalogs, greeting cards, posters, labels, packaging, folding boxes, decalcomanias, coupons, trading stamps, and art reproductions. Many sheetfed presses can perfect (print both sides of the paper) in one pass through the press. Web offset is used for printing business forms, newspapers, preprinted newspaper inserts, advertising literature, catalogs, long-run books, encyclopedias, and magazines.

In offset lithography, the rubber blanket surface conforms to irregular printing surfaces, resulting in the need for less pressure and preparation. It has improved print quality of text and halftones on rough surfaced papers. Further, the substrate does not contact the printing plate thereby increasing plate life and reducing abrasive wear. Also, the image on the plate is right for reading rather than reverse reading. Finally, less ink is required for equal coverage, drying is speeded, and smudging and setoff are reduced. Setoff is a condition that results when wet ink on the surface of the press sheets transfers or sticks to the backs of other sheets in the delivery pile.

Thus, in summary, conventional lithographic offset printing machines or presses comprise one or more image printing stations each having a printing roller or a plate cylinder to which is fastened a thin hydrophilic, oleophobic printing plate having image areas which are oleophilic and hydrophobic and background areas which are oleophobic and hydrophilic. The plate surface is continuously wetted with an aqueous damping solution which adheres only to the background areas and inked with oleo-resinous inks which adhere only to the image areas of the plate as wet ink. The ink is offset transferred to the rubber surface of a contacting blanket cylinder and then retransferred to the receptive surface of a copy web or a succession of copy sheets, such as paper, with an impression cylinder and the ink air dries by oxidation and curing after passing through a drying station.

It is also known to provide the printing machine with a downstream coating station having a blanket roller associated with a coating application unit for the application of an overall protective coating over the entire printed area of the copy sheets or web.

It is known to apply pattern coatings of protective composition by means of blanket rolls by cutting into the rubber surface of the blanket to create raised or relief surface areas which selectively receive the coating composition from the application roll for retransfer to selected areas of the copy sheets in form of pattern coatings. See U.S. Pat. No. 4,796,556.

Lithographic inks are formulated to print from planographic surfaces which use the principle that grease and water do not mix. Lithographic inks are generally very strong in color value to compensate for the lesser amount applied. They are among the strongest of all inks. The average amount of ink transferred to the paper is about half that of letter press because of the double split of the ink film between the plate cylinder and the blanket cylinder and the blanket cylinder and the substrate on the impression cylinder.

Problems occur in the offset lithographic process when attempting to print certain colors such as white and in particular white on other colors such as yellow because the color white will be faint and not sufficiently strong. In such cases, the sheet or paper or substrate requiring the white ink usually has to be run through the same printer several times before the white becomes sufficiently strong.

Further, such colors are not generally printable in an offset lithographic printing process. This means that the sheets or substrate must be removed and transferred to a second type of machine using the flexographic process to apply greater amounts of ink in successive printing runs to achieve the desired print quality.

A like situation occurs with the printing of slurry-type materials such as "scratch-and-sniff" materials which is a liquid vehicle with a slurry containing an encapsulated essence. Such liquid vehicles, because of the nature of the slurry, must be printed with a flexographic process because the anilox roller can supply greater amounts of ink to the [flexo] *flexographic* plate on the plate cylinder.

Again, when a liquid vehicle with a slurry having suspended material therein such as metallic particles is to be printed, an offset lithographic process cannot be used without the mixing of the aqueous solution with metallic inks which cause a dulling of the image. Further, the above-mentioned double split of the ink film adds to the dulling of the image. Therefore, to achieve desired results, the printing must take place with a flexographic printing machine.

Thus, liquid opaque coatings or inks such as white colored ink, scratch-and-sniff vehicles, and slurries with metal particles do not achieve desired results when printed in an offset lithographic process and must be transferred from the offset lithographic in-line machines to a separate machine for printing in a separate run.

Such requirements not only hinder the speed of the printing process but also require additional time and thus increase the cost of the printing.

It would be advantageous to have a continuous in-line process in which not only offset lithographic printing could take place but in which, in the same in-line process, liquid printing vehicles including opaque coatings, such as white ink, and slurries containing encapsulated essences or metallic particles could also be printed and dried not only before the printing of the offset lithographic inks but also in which, after the liquid opaque coatings have been applied, an overcoating could be applied to the printed liquid vehicle image using the lithographic process in the continuous in-line process.

SUMMARY OF THE INVENTION

The present invention provides for a continuous in-line printing process having a plurality of successive printing stations for printing color images on a substrate. At least one of the stations prints a liquid vehicle image on a substrate with an opaque coating using the flexographic process and at least one of the successive printing stations printing a second color image over the liquid vehicle image on the printed substrate using the lithographic process in the continuous in-line process.

In the novel inventive system, a single in-line continuous printing process is used. One of the stations may print a liquid vehicle image on a substrate that contains a slurry with an encapsulated essence therein utilizing the flexographic process. Another one of the stations may apply an overcoating over the liquid vehicle image on the printed substrate using a lithographic process. Still another of the stations may print an aqueous-based vehicle image including a suspended metallic material therein using the flexographic process to form a metallic coating and thereafter at least one of the successive printing stations prints a color image over the aqueous-based vehicle image using the lithographic offset process in the continuous in-line process.

Whenever a station is used for flexographic printing, a flexographic plate [image] is placed on the blanket cylinder for receiving the liquid vehicle and transferring the liquid vehicle to the *receptive surface of the copy web or succession of copy sheets on the* impression cylinder for printing. An anilox roller is associated with the flexographic plate for supplying the liquid vehicle which may be an aqueous-based vehicle.

In addition, in such case, a high-velocity air dryer is associated with the impression cylinder of one or more of the printing stations where the printing on the substrate is occurring to assist in drying the ink or liquid vehicle printed on the substrate while it is on or near the impression cylinder, before the substrate arrives at the next successive station for additional printing, or before printing occurs at the next successive station.

Thus, if a liquid vehicle such as white ink is to be printed, it is printed with a flexographic process which deposits a greater amount of ink on the substrate, the ink is dried with a high-velocity air dryer while the substrate is on or near the impression cylinder and prior to the substrate being received by the next successive station. If desired, at the next successive station the printing of the white liquid vehicle may again take place thus ensuring the desired intensity of whiteness on the substrate. Subsequently, at the next succeeding station a printing may take place on top of the white printing and such printing may continue at the remaining successive stations.

Thus, it is an object of the present invention to provide a plurality of successive printing stations for printing color images on a substrate in a continuous in-line process and in which some of the stations print using the flexographic process and other of the stations print utilizing the offset lithographic process.

It is also an object of the present invention to print an aqueous-based vehicle image including a suspended metallic material therein using the flexographic process at one printing station and at least one successive printing station printing a color image over the aqueous-based vehicle image using a lithographic process in a continuous in-line process or placing an overcoating over the aqueous-based vehicle image using the flexographic process and then printing at successive stations using the lithographic process.

It is yet another object of the present invention to provide a continuous in-line printing process in which one of the stations prints a liquid vehicle image on the substrate with a slurry containing an encapsulated essence using the flexographic process and at least one of the successive printing stations applies an overcoating over the liquid vehicle image on the printed substrate using the offset lithographic process in a continuous in-line process.

BRIEF DESCRIPTION OF THE DRAWINGS

These and other features of the present invention will be more fully disclosed when taken in conjunction with the following DETAILED DESCRIPTION OF THE PRESENT INVENTION in which like numerals represent like elements and in which.

DETAILED DESCRIPTION OF THE PRESENT INVENTION

Figure 1:
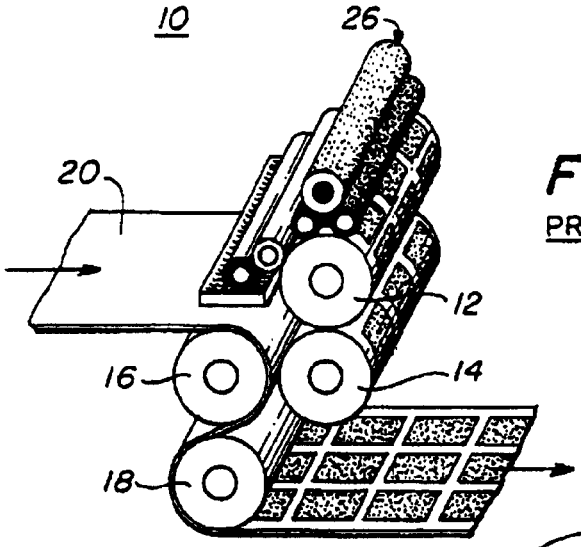
FIG. 1 PRIOR ART
FIG. 1 is a schematic view of a prior art offset lithography printing station.

FIG. 1 is a schematic representation of a well-known offset lithography printing station 10 having a plate cylinder 12, a blanket cylinder 14, and an impression cylinder 16. The printing medium or substrate, such as paper 20 either in sheet form or web, is fed over the impression cylinder 16 in printing contact with the blanket cylinder 14 to receive the image and then passes over the paper transfer cylinder 18 with the image printed thereon. An inking system 26, well known in the art, transfers the ink from the ink supply to the plate cylinder 12. This is a typical offset lithography printing station.

As disclosed in U.S. Pat. No. 4,796,556, offset lithographic printing machines generally have a plurality of in-line liquid application stations at least one of which is an ink image printing station for printing lithographic ink images on to suitable receptive copy sheets. The final downstream liquid application station is a coating application station for printing a protective and/or aesthetic coating over selected portions of or over the entire ink-image printed surface of the copy sheets and can also be used to print metallic coatings or slurry. As stated in U.S. Pat. No. 4,796,556, two liquid application stations are shown, the latter including a coating apparatus and the first station being a conventional offset image printing station. The coating application printing station is one that can be modified to convert it either permanently or intermittently to a coating station from an offset lithographic station.

Figure 2:
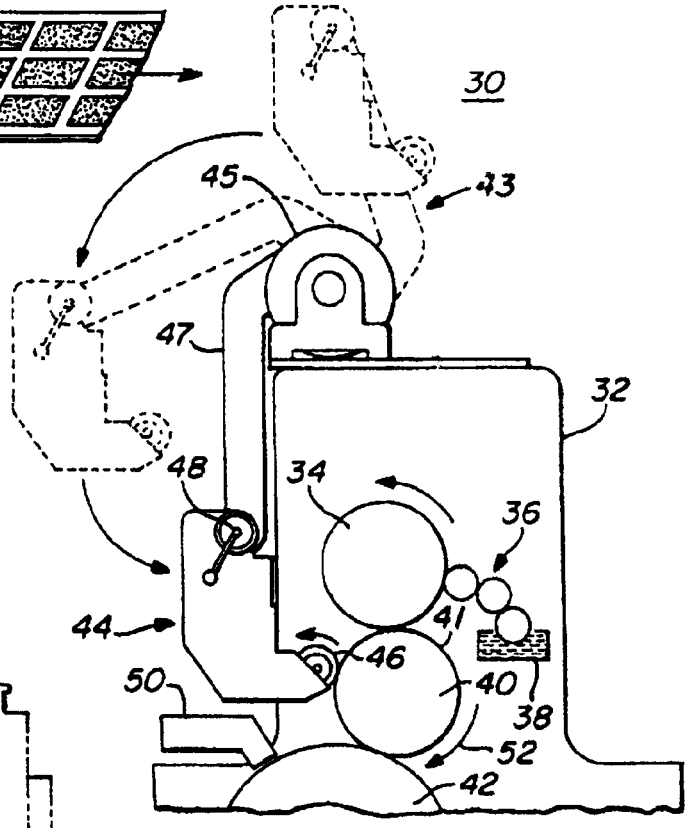
FIG. 2 is a generalized depiction of a printing station that may be used either as an offset lithographic station or a flexographic printing station and illustrates how the station may be converted from an offset lithographic station to a flexographic station.

Such a station is illustrated in FIG. 2 herein. The station 30 comprises a housing 32 which includes therein a plate cylinder 34 that is fed with an ink system of rollers 36 that take ink from an ink supply 38 and transfer it to the plate cylinder 34. A blanket cylinder 40 is in ink transfer relationship with the plate cylinder 34 and the impression cylinder 42 where the image is transferred to a substrate passing between blanket cylinder 40 and impression cylinder 42 as blanket cylinder 40 rotates in the direction of arrow 52. This is a conventional offset lithographic printing station. When it is desired to convert that station into a coater station, the coater apparatus 43 has a coater head 44 including a supply of liquid coating and an anilox roller 46 that can be moved such that it can be in contact with either the blanket cylinder 40 for direct printing or the plate cylinder 34 for offset printing. In this case, the ink roller 36 for the lithographic system are removed from engagement with the plate cylinder 34 in a well-known manner. The coater unit 43 includes a motor device 45, an arm 47, and a pivotal connection 48 that connects the coater head 44 with the remainder of the assembly.

As stated previously, the offset lithographic machine of FIG. 2 is converted as shown therein to a coater that is used only in the last stage of an in-line printing process. It has not been able to be used in stages other than the last printing station because the ink that is placed on the blanket cylinder by means of an anilox roller is still wet when it arrives at the subsequent stations, thus causing smearing of the printed material and causing a general impossibility of printing other information thereon. However, applicant has modified the station shown in FIG. 2 by the addition of a high-velocity air dryer 50 that is associated with the impression cylinder 42 directly after the ink is transferred from the blanket cylinder to the substrate on the impression cylinder. Thus by using flexographic inks, or aqueous coatings which are naturally quick-drying inks, and the high-velocity air dryer 50 located at the point where the ink is applied to the substrate on the impression cylinder, the ink is sufficiently dried when it passes to the next station that further printing can take place on the printed substrate.

Figure 3:
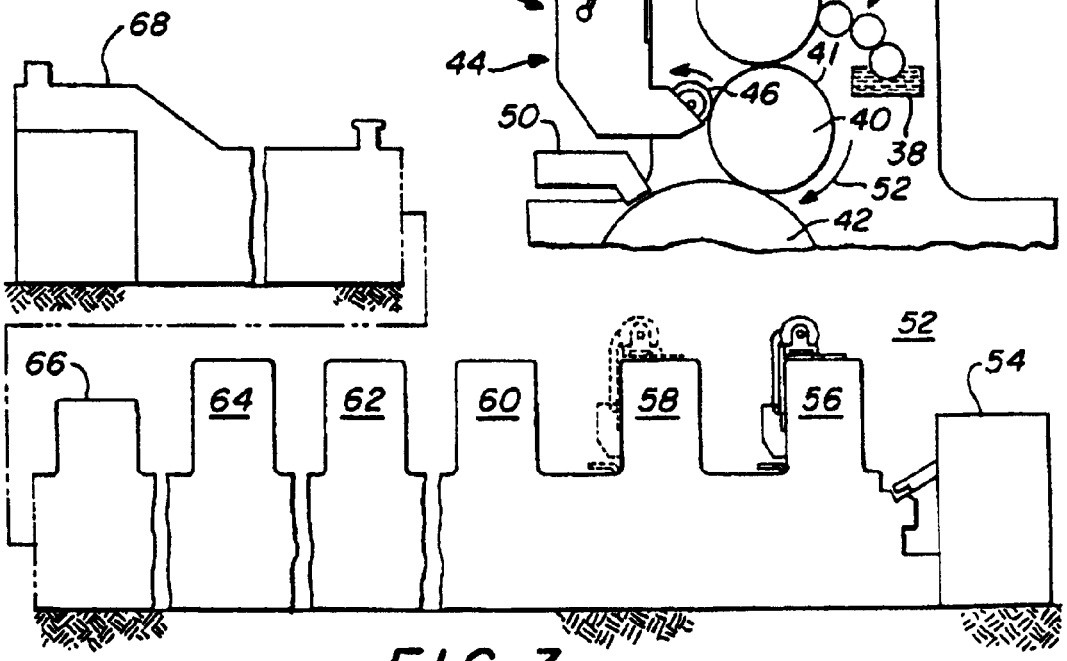
FIG. 3 illustrates the continuous in-line process of the present invention comprising a plurality of printing stations, each of which can be converted from an offset lithographic printing station to a flexographic printing station as well as a final coating station.

Thus, as shown in FIG. 3, a conventional in-line offset lithographic printing machine 52 is shown having an apparatus to feed paper into the said machine, referred to as a feeder 54, printing stations 56, 58, 60, 62, and 64 and a coating station 66. A delivery station 68 receives the printed material or substrates. Thus there are a plurality of successive printing stations 56, 58, 60, 62, and 64 for printing color images on the substrate in a continuous in-line process. Any one of the printing stations 56–64 can be modified as generally shown therein and as illustrated in FIG. 2 to print a first color image using the flexographic process. The succeeding printing stations can then print a second color image over the first color image using the lithographic process in the continuous in-line process. As illustrated in FIG. 2, the flexographic process printing station includes the blanket cylinder 40 and the impression cylinder 42. A flexographic plate 41 on the blanket cylinder 40 has an image thereon for receiving the first color from the anilox roller 46 and transferring that first color image to the impression cylinder 42 for printing on the substrate. The high-velocity air dryer 50 thus dries the flexographic ink on the substrate and passes the substrate to the subsequent printing station. Thus in FIG. 3, station 56 may be modified as generally shown therein and illustrated in FIG. 2 and a flexographic ink can be printed thereon at station 56, dried by the high-velocity air dryer 50, and coupled to subsequent in-line stations 58–64 for further printing a second or more color images over the first color image using the offset lithographic process in a continuous in-line process. The flexographic printing station shown in FIG. 2 may print a liquid vehicle image on the substrate with a slurry containing an encapsulated essence. At at least one of the successive printing stations 58–64 an overcoating may be applied over the liquid vehicle image on the printed substrate using the flexographic process in the continuous in-line process. The overocating may be an aqueous overcoating, or an ultraviolet overcoating. In addition, the substrate may be a sheet or a web 20 as illustrated in FIG. 1 or it may be single sheet fed in the continuous in-line process from the stack sheets shown at 54 in FIG. 3.

Further, the modified flexographic printing station 30 shown in FIG. 2, as stated previously, may be any one of the stations 56–64 in FIG. 3, and as illustrated by stations 56 and 58, and may print an aqueous-based vehicle image including a suspended metallic material therein using the flexographic process to form a metallic coating. Again, after it is dried by the high-velocity air dryer 50, it may be passed to one of the successive printing stations for printing a color image over the aqueous-based vehicle image using the offset lithographic process in the continuous in-line process. The suspended material may include uniform-sized metal particles to form the metallic coating or it may include nonuniform or multiple-sized metal particles to form the metallic coating.

The present invention is especially useful when a liquid opaque coating must be printed such as a whole color ink. In that case, it may be desirable to have both stations 56 and 58 modified as shown in FIG. 3 and as illustrated in detail in FIG. 2. In such case, the anilox roller 46 at each station delivers the white ink in the same pattern to the flexographic plate 41 on the blanket cylinder 40 for transfer to the substrate on the impression cylinder 42. As the substrate passes the high-velocity drying station 50, the ink is dried and the second station may again print the same white pattern on the substrate to increase the quality of the white ink appearance after is applied to the substrate.

Thus, the station or stations that are converted to flexographic printing stations may have an ink-providing means 46 at the printing station for applying a flexographic ink to the blanket cylinder to form the image. A substrate receives the flexographic ink image transfer from the blanket cylinder and at least one subsequent printing station in the in-line process receives the image-printed substrate and prints an additional coated ink image on the substrate on top of the flexographic ink image using offset lithography. The additional colored ink images that can be printed on top of the flexographic ink images can be conventional lithographic inks or waterless inks.

Further, the colored ink images may be printed with halftone screening processes. The flexographic ink image and the colored ink images may also be printed in solids and/or halftone printing plates in sequence and in registry in successive printing stations to produce a multicolored image on the substrate. Further, the printing apparatus may include a sheetfed press or a web press.

In the present invention, at least one of the flexographic printing stations prints an image with liquid vehicle slurry containing an encapsulated essence. In another embodiment, at least one of the printing stations prints an image with a water-based liquid vehicle containing suspended particles that are either uniform or nonuniform in size. The suspended particles may be metallic particles up to substantially 16 microns in diameter.

The present invention may also use the metallic color printing process as disclosed in commonly assigned U.S. Pat. No. 5,370,976 incorporated herein by reference in its entirety.

In one aspect, the novelty of the present invention is to create a flexographic printing station that can be used at one of a plurality of printing stations in a continuous in-line process and in which, at a subsequent printing station, a lithographic process may be used to print over the liquid vehicle printed by the flexographic station.

Thus, there has been disclosed an apparatus for a combined lithographic/flexographic printing process that includes a plurality of successive printing stations for printing color images on a substrate in a continuous in-line process and wherein one of the stations prints a first color image using the flexographic process and at least one of the successive printing stations prints a second color image over the first color image using the lithographic process in the continuous in-line process.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. Apparatus for a combined lithographic/flexographic printing process comprising:

a substrate;

a plurality of successive printing stations for printing color images on the substrate in a continuous in-line process;

one of said stations comprising a flexographic printing station for printing a liquid vehicle image on said substrate with a slurry containing an encapsulated essence using the flexographic process;

at least one of said successive printing stations being a lithographic printing station; and an overcoating applied over the liquid vehicle image on the printed substrate at at least one of said successive lithographic printing stations using the lithographic process in said continuous in-line process.

2. Apparatus as in claim 1 wherein said overcoating is an aqueous overcoating.

3. Apparatus as in claim 1 wherein said overcoating is an ultraviolet ink overcoating.

4. Apparatus as in claim 1 wherein:

said substrate is a paper sheet; and said apparatus includes a sheet feeder.

5. Apparatus as in claim 1 wherein:

said substrate is a web; and said apparatus includes a web feeder.

6. Apparatus for a combined lithographic/flexographic printing process comprising:

a plurality of successive printing stations for printing color images on a substrate in a continuous in-line process;

one of said *printing* stations comprising a *first offset* flexographic printing station *for* printing an aqueous-based vehicle image using the flexographic process to form a metallic coating *on said substrate*;

a suspended metallic material being included in said aqueous-based vehicle image; [and]

*a dryer disposed downstream of said first flexographic printing station in the direction of movement of said substrate with respect to said printing stations for treating said aqueous-based vehicle image; and* at least one of the successive printing stations comprising an offset lithographic printing station *downstream of said dryer for* printing a color image over the aqueous-based vehicle image using the offset lithographic process in said continuous in-line process.

7. Apparatus as in claim 6 wherein said suspended material includes uniform-sized metal particles to form said metallic coating.

8. Apparatus as in claim 6 wherein said suspended material includes nonuniform-sized metal particles to form said metallic coating.

9. Apparatus as in claim 6 further including:

said flexographic printing station including a plate cylinder having a flexographic plate thereon, a blanket cylinder, and an impression cylinder;

a flexographic plate image transferred from said plate cylinder to said blanket cylinder, said image being formed of said metallic coating, *said impression cylinder in ink-transfer relationship with said blanket cylinder,* said blanket cylinder transferring said metallic coating to said [impression cylinder] *substrate* for printing said flexographic plate image on said substrate; and an anilox roller associated with said flexographic plate for supplying said aqueous-based vehicle containing said suspended metallic material to said flexographic plate.

10. Apparatus for creating a combined lithographic/flexographic printing process comprising:

a plurality of successive printing stations for printing color images on a substrate in a continuous in-line process;

one of said stations comprising a *first* flexographic printing station for printing a first color image using the flexographic process; and

*one of said stations downstream of the first flexographic printing station comprising a second flexographic printing station for printing or coating the substrate using the flexographic process;* at least one of the successive printing stations comprising an offset lithographic printing station for printing a second color image over the first color image using the offset lithographic process in said continuous in-line process.

11. Apparatus as in claim 10 further including:

said *first* flexographic printing station including a plate cylinder, a blanket cylinder, and an impression cylinder;

a flexographic plate on said plate cylinder;

an anilox roller associated with said flexographic plate for supplying a first color to said flexographic plate to form said first color image; and said blanket cylinder receiving said first color image from said plate cylinder and transferring said first color image to [said impression cylinder for printing on] said substrate.

12. Apparatus for creating a combined lithographic/flexographic printing process comprising:

a substrate;

a plurality of successive printing stations for printing color images on the substrate in a continuous in-line process;

at least two successive ones of said printing stations being flexography stations and comprising:

(1) a supply of liquid coating;

(2) a plate cylinder associated with a blanket cylinder, said plate cylinder having a flexographic plate thereon;

(3) an anilox roller associated with said liquid supply coating and said plate cylinder for delivering said liquid coating to said flexographic plate to form an image for transfer to said blanket cylinder;

(4) an impression cylinder for receiving said liquid coating image transferred from said blanket cylinder and printing said image on said substrate, said at least two flexography stations printing the same liquid coating image in sequence and in superimposed relationship; and at least one offset lithographic printing station for receiving said substrate and printing over said liquid coating image.

13. Apparatus as in claim 12 wherein said liquid coating image printed on said substrate is a white color ink.

14. Apparatus as in claim 12 further including an air dryer associated with each of said impression cylinders on said flexography stations, said air dryer having sufficient air velocity for drying said liquid coating before the substrate is transferred to the successive printing station in said continuous in-line process.

15. Apparatus for a combined lithographic/flexographic printing process comprising:

a plurality of successive printing stations for printing color images on a substrate in a continuous in-line process, said printing stations including both lithographic and flexographic printing stations;

*one of said printing stations comprising a first flexographic printing station;*

*one of said printing stations comprising a first lithographic printing station;* a blanket cylinder at [at least a first one of] said *first* flexographic printing station[s];

*an impression cylinder associated with said first flexographic printing station;* flexographic ink-providing means at said [at least] first [one of said] flexographic printing station[s] for applying a flexographic ink to said blanket cylinder to form an image;

a substrate for receiving said flexographic ink image transferred from said blanket cylinder; [and]

[at least one subsequent] *a second* lithographic printing station in said in-line process for receiving said image printed substrate and printing an additional colored ink image on said substrate on top of said flexographic ink image using offset lithography[.]*; and*

*a second flexographic printing station.*

16. Apparatus as in claim 15 further comprising:

a plate cylinder at said [at least first one of said] *first* flexographic station[s];

a flexographic plate on said plate cylinder for receiving and transferring said flexographic ink to said blanket cylinder; and said flexographic ink-providing means including a flexographic ink supply and an anilox roller associated with said flexographic ink supply for transferring said flexographic ink to said flexographic plate.

17. Apparatus for a combined lithographic/flexographic printing process for printing a multicolored image comprising:

a plurality of successive printing stations for printing color on a substrate in a continuous in-line process, said printing stations including both lithographic and flexographic printing stations;

[at least] one of said flexographic printing stations *being a first flexographic printing station* having:

(1) a plate cylinder and a blanket cylinder, said plate cylinder including a flexographic plate having an image thereon for transferring a flexographic color ink image to said blanket cylinder;

(2) an etched anilox roller for applying a flexographic color ink to said flexographic plate on said plate cylinder;

(3) an impression cylinder in ink-transfer relationship with said blanket cylinder for transferring said flexographic color ink image from said blanket cylinder to said substrate; and at least one of said succeeding printing stations being a lithographic printing station using offset lithography for printing additional colored ink images on top of said flexographic ink image[.]*; and*

*one of said flexographic printing stations being a second flexographic printing station.*

18. Apparatus as in claim 17 wherein said additional colored ink images are formed with lithographic inks.

19. Apparatus as in claim 17 wherein said colored ink images are formed with waterless inks.

20. Apparatus as in claim 17 further including an air dryer adjacent to said impression cylinder for drying the flexographic ink image transferred to said substrate before said additional colored ink images are printed thereon.

21. Apparatus as in claim 17 further including halftone printing plates for printing said *additional* colored ink images.

22. Apparatus as in claim 17 wherein said flexographic ink image and said colored ink images are printed as solid colors and/or with halftone printing plates in sequence and in registry in said successive printing stations to produce said multicolored image on said substrate.

23. Apparatus as in claim 17 wherein said printing apparatus includes a sheet-fed press.

24. Apparatus as in claim 17 wherein [at least one of] said *first* flexographic printing [stations] *station* prints said flexographic *color* ink image with liquid vehicle slurry containing an encapsulated essence.

25. Apparatus as in claim 17 wherein [at least one of] said *first flexographic* printing [stations] *station* prints said flexographic *color* ink image with a water-based liquid vehicle containing suspended particles.

26. Apparatus as in claim 25 wherein said suspended particles are uniform in size.

27. Apparatus as in claim 25 wherein said suspended particles are nonuniform in size.

28. Apparatus as in claim 25 wherein said suspended particles are metallic particles.

29. A method of combining lithography and flexographic printing in a continuous in-line process comprising the steps of:

providing a plurality of successive lithographic/flexographic printing stations for printing colored ink images on a substrate;

printing a flexographic ink image on said substrate [at] at least [one of said] *at a first* flexographic [stations] *printing station*;

transferring said printed substrate to at least one subsequent *lithographic* printing station in said continuous in-line process; [and]

printing colored ink images on top of said flexographic ink image at [at least one of] said subsequent lithographic printing [stations] *station* with an offset lithographic process*; and*

*printing a coating on said substrate over said ink images at a second flexographic printing station.*

30. A method as in claim 29 further comprising the step of drying said flexographic ink image on said substrate with an air dryer prior to printing said colored ink images thereon.

[31. A method as in claim 29 further including the step of printing a coating on top of said colored ink images at one of said plurality of subsequent printing stations.]

32. A method as in claim 29 wherein said colored [inks forming said colored] ink images are *with* waterless *colored inks*.

33. A method as in claim 29 wherein said [colored inks forming said] colored ink images are *printed with colored ink* in a solvent-based liquid vehicle.

34. A method as in claim 29 further including the steps of:

printing a slurry on said substrate at any of said printing stations in said continuous in-line process;

using an encapsulated essence in said slurry; and printing [an overcoating] *said coating* over said slurry [at a subsequent printing station in said in-line process] to protect said essence.

35. A method as in claim 34 [further including] *wherein* the step of printing *said coating comprises printing* an aqueous-based coating over said slurry.

36. A method as in claim 34 [further including] *wherein* the step of printing *said coating comprises printing* an ultraviolet coating over said slurry.

37. A method of combining offset lithography and flexographic printing in a continuous in-line process comprising the steps of:

providing a substrate;

applying a flexographic ink to a blanket cylinder in a pattern with a coating head at a first flexographic printing station;

transferring said pattern of flexographic ink from said blanket cylinder to the substrate; [and]

*transferring said substrate to a second flexographic printing station;*

*applying a pattern of flexographic ink to the substrate using the second flexographic printing station; and* printing a waterless ink pattern over *at least one of* said flexographic ink [pattern] *patterns* on said substrate [at] *using* at least one subsequent offset lithographic printing station in said continuous in-line process.

38. A method of combining lithography and flexographic printing in a continuous in-line process comprising the steps of:

printing an aqueous-based vehicle image having suspended particles therein on a substrate at a first flexographic printing station;

transferring said image printed substrate to [at least one additional] *a subsequent* printing station in said continuous in-line process; [and]

printing additional colored ink images on said printed substrate over said aqueous-based vehicle image in an offset lithographic process at said [at least one additional] *subsequent* printing station in said in-line process; *and*

*printing a coating over said colored ink images on said substrate using a flexographic process.*

39. A method of combining lithography and flexographic printing in a continuous in-line process comprising the steps of:

(1) providing a plurality of successive printing stations for printing liquid vehicle images on a substrate in said in-line continuous process;

(2) utilizing an anilox roller to transfer a liquid ink as said liquid vehicle to a flexographic plate image at at least one of said printing stations;

(3) printing said liquid ink from said flexographic plate image to a substrate;

(4) transferring said printed substrate with said liquid ink image to a subsequent printing station in said in-line printing process;

(5) repeating steps (2)–(4) at subsequent printing stations in said in-line process to achieve a desired opacity ink image on said substrate; and (6) printing an ink pattern over said flexographic ink image using an offset lithographic process.

40. A method as in claim 39 further including the step of additionally printing colored ink images over said liquid ink image on said substrate at subsequent ones of said printing stations in said in-line process.

41. A method as in claim 40 wherein said liquid ink is an opaque white color.

*42. Apparatus for a combined lithographic/flexographic printing process comprising:*

*a plurality of successive printing stations for depositing a series of images on a substrate in a continuous in-line process, said printing stations including, both lithographic and two flexographic printing stations;*

*a blanket cylinder at a first one of said flexographic printing stations;*

*a plate cylinder at said first one of said flexographic stations; and*

*a flexographic plate on said plate cylinder for receiving and transferring flexographic ink to said blanket cylinder;*

*a flexographic ink supply and an anilox roller associated with said flexographic ink supply for transferring flexographic ink to said flexographic plate and then to said blanket cylinder to form an image on one side of a substrate;*

*a substrate for receiving said flexographic ink image transferred from said blanket cylinder; and*

*at least one subsequent lithographic printing station in said in-line process for receiving said image printed substrate and printing an additional colored ink image on said substrate on top of said flexographic ink image.*

*43. A method of combining lithography and flexographic printing in a continuous in-line process comprising the steps of:*

*(1) providing a plurality of successive printing stations for depositing a series of images on a substrate in said in-line continuous process;*

*(2) utilizing an anilox roller to transfer a liquid ink as one of said series of images to a flexographic plate image at least one of said printing stations;*

*(3) printing said liquid ink from said flexographic plate image to one side of said substrate;*

*(4) transferring said printed substrate with said liquid ink image to a subsequent printing station in said inline printing process;*

*(5) repeating steps (2)–(4) at subsequent printing stations in said in-line process to achieve a desired opacity ink image on the one side of said substrate; and*

*(6) printing an ink pattern on said substrate using an offset lithographic process.*

*44. A method as in claim 43 further including the step additionally printing ink images over said liquid ink image on said substrate at subsequent ones of said printing stations in said in-line process of.*

*45. A method as in claim 44 wherein said liquid ink is an opaque white color.*

*46. Apparatus for a combined lithographic/flexographic printing process comprising:*

*a plurality of successive printing stations for printing color images on a substrate in a continuous in-line process, the successive printing stations including:*

*a first flexographic printing station for printing an image on the first side of the substrate using the flexographic process;*

*a first lithographic printing station, subsequent in the continuous in-line process to the first lithographic printing station, for printing an image on the substrate using the lithographic process;*

*a second flexographic printing station, subsequent in the continuous in-line process to the first lithographic printing station, for printing an image on the substrate using the flexographic process; and*

*a second lithographic printing station, subsequent in the continuous in-line process to the second flexographic printing station, for printing an image on the first side of the substrate using the lithographic process.*

*47. Apparatus for a combined lithographic/flexographic printing process comprising:*

*a plurality of successive printing stations for printing color images on a substrate in a continuous in-line process, the successive printing stations including:*

*a first flexographic printing station;*

*a first dryer, subsequent in the continuous in-line process to the first flexographic printing station;*

*a first lithographic printing station, subsequent in the continuous in-line process to the first dryer;*

*a second dryer, subsequent in the continuous in-line process to the first lithographic printing station;*

*a second flexographic printing station, subsequent in the continuous in-line process to the second dryer; and*

*a third dryer, subsequent in the continuous in-line process to the second flexographic printing station.*

*48. A method for a combined lithographic/flexographic printing process, the method comprising the steps of:*

*providing a substrate having a first side and a second side;*

*printing an image on the first side of the substrate using a first lithographic printing station;*

*transferring the substrate from the first lithographic printing station to a first flexographic printing station;*

*printing an image on the first side of the substrate using the first flexographic printing station;*

*transferring the substrate from the first flexographic printing station to a second lithographic printing station;*

*printing an image on the first side of the substrate using the second lithographic printing station;*

*transferring the substrate from the second lithographic printing station to a second flexographic printing station;*

*printing an image on the first side of the substrate using the second flexographic printing station.*

*49. A method for a combined lithographic/flexographic printing process, the method comprising the steps of:*

*providing a substrate;*

*printing an image on the substrate using a first lithographic printing station;*

*transferring the substrate from the first lithographic printing station to a first flexographic printing station;*

*printing an image on the substrate using the first flexographic printing station; transferring the substrate from the first flexographic printing station to a first dryer;*

*drying the substrate in the first dryer;*

*transferring the substrate from the first dryer to a second lithographic printing station;*

*printing an image on the first side of the substrate using the second lithographic printing station;*

*transferring the substrate from the second lithographic printing station to a second dryer;*

*drying the substrate in the second dryer;*

*transferring the substrate from the second dryer to a second flexographic printing station;*

*printing an image on the substrate using the second flexographic printing station;*

*transferring the substrate from the second flexographic printing station to a third dryer; and*

*drying the substrate in the third dryer.*

*50. Apparatus for providing a combined lithographic/flexographic printing process comprising:*

*a plurality of successive printing stations for printing color images on a substrate in a continuous in-line process, the successive printing stations comprising:*

*a first flexographic printing station for printing an image on said substrate using the flexographic process;*

*a first lithographic printing station, subsequent in the continuous in-line process to the first flexographic printing station, for printing an image on the substrate using the lithographic process; and*

*a dryer disposed between said printing stations for drying the image printed by said first flexographic printing station.*

*51. The apparatus of claim 50 including:*

*at least one further lithographic printing station, subsequent in the continuous in-line process to the first lithographic printing station, for printing images on said substrate using the lithographic process.*

*52. The apparatus of claim 51 including:*

*a dryer disposed between said first lithographic printing station and said further lithographic printing station for drying images printed on said substrate.*

*53. The apparatus of claim 52 including:*

*a second flexographic printing station, subsequent in the continuous in-line process to said further lithographic printing station for at least one of printing an image on said substrate and applying a coating on said substrate using the flexographic process.*

*54. Apparatus for a combined lithographic/flexographic printing process, comprising:*

*a plurality of successive printing stations for printing color images on a substrate in a continuous in-line process;*

*one of said stations comprising a flexographic printing station capable of printing a liquid vehicle image on said substrate with a slurry containing an encapsulated essence using the flexographic process;*

*at least one of said successive printing stations being a lithographic printing station for using the lithographic process in said continuous in-line process; and*

*means enabling the application of an overcoating over the liquid vehicle image on the printed substrate.*

*55. Apparatus for creating a combined lithographic/flexographic printing process comprising:*

*a plurality of successive printing stations for printing images on a substrate in a continuous in-line process;*

*one of said stations comprising a flexographic printing unit for printing a first image using the flexographic process; and*

*at least one successive printing station comprising a lithographic printing unit for printing an image over said first image using the lithographic process in said continuous in-line process.*

* * * * *

UNITED STATES PATENT AND TRADEMARK OFFICE

CERTIFICATE OF CORRECTION

PATENT NO. : RE 41,048 E
APPLICATION NO. : 09/315796
DATED : December 22, 2009
INVENTOR(S) : Bill L. Davis et al.

It is certified that error appears in the above-identified patent and that said Letters Patent is hereby corrected as shown below:

Column 1, line 9, before the heading "BACKGROUND OF THE INVENTION" insert:

--Notice: More than one reissue application has been filed for the reissue of patent 5,630,363. The reissue applications are Application No. 09/315,796 and Application No. 12/548,149, with Application No. 12/548,149 being a continuation of Application 09/315,796.--

Signed and Sealed this

Eighth Day of June, 2010

David J. Kappos

David J. Kappos
*Director of the United States Patent and Trademark Office*